(12) United States Patent
Singh

(10) Patent No.: US 9,148,024 B2
(45) Date of Patent: Sep. 29, 2015

(54) APPARATUSES, SYSTEMS, AND METHODS FOR A MONOTONIC TRANSFER FUNCTION IN WIRELESS POWER TRANSFER SYSTEMS

(75) Inventor: Manjit Singh, Fremont, CA (US)

(73) Assignee: Integrated Device Technology Inc., San Jose, CA (US)

( * ) Notice: Subject to any disclaimer, the term of this patent is extended or adjusted under 35 U.S.C. 154(b) by 752 days.

(21) Appl. No.: 13/403,535

(22) Filed: Feb. 23, 2012

(65) Prior Publication Data

US 2013/0221756 A1 Aug. 29, 2013

(51) Int. Cl.
*H02J 17/00* (2006.01)
*H02J 5/00* (2006.01)
*H02J 7/02* (2006.01)

(52) U.S. Cl.
CPC . *H02J 5/005* (2013.01); *H02J 7/025* (2013.01)

(58) Field of Classification Search
None
See application file for complete search history.

(56) References Cited

U.S. PATENT DOCUMENTS

2010/0148723 A1\* 6/2010 Cook et al. .................... 320/108

\* cited by examiner

*Primary Examiner* — Jared Fureman
*Assistant Examiner* — Aqeel Bukhari
(74) *Attorney, Agent, or Firm* — Traskbritt P.C.

(57) ABSTRACT

A wireless power-transfer system includes a power-transmitting device and a power-receiving device. A frequency generator generates a power-transmit frequency to stimulate transmit coil and transmit resonance adjuster, which generate a near-field electromagnetic radiation at an adjustable coupling frequency. The power-receiving device includes a receive coil and a receive resonance adjuster for receiving the near-field electromagnetic radiation when the receive coil is within a coupling region of the transmit coil. The receive resonance frequency may be modified by the receive resonance adjuster. In the wireless power-transfer system, one or both of the transmit resonance adjuster and the receive resonance adjuster is configured to adjust its corresponding frequency to be sufficiently less than the power-transmit frequency such that a monotonic transfer function is developed between the power-transmit frequency and the receive resonance frequency.

24 Claims, 7 Drawing Sheets

APPARATUSES, SYSTEMS, AND METHODS FOR A MONOTONIC TRANSFER FUNCTION IN WIRELESS POWER TRANSFER SYSTEMS

TECHNICAL FIELD

Embodiments of the present disclosure relate generally to power transfer and, more particularly, to apparatuses, systems, and methods related to inductive wireless power transfer.

BACKGROUND

Battery-powered devices (e.g., consumer electronic devices, electric and hybrid automobiles, etc.) are charged from a power source (e.g., AC power outlet) through a charging device. The charging device couples the battery to the power source through an adaptor. The cord extending between the power source and the battery-powered device can take up space. In situations where multiple devices require charging, each with their own charger and cord, the charging area can become cramped and inconvenient.

Approaches are being developed that use over-the-air or wireless power transmission between a transmitter and a receiver coupled to the electronic device. Wireless power transmission using inductive coils is one method considered as an un-tethered method for transferring power wirelessly through a coupled electromagnetic field. In inductive wireless power transmission, power is transferred by transmitting an electromagnetic field through a transmit coil. On the receiver side, a receiver coil may couple with the transmit coil through the electromagnetic field, thus, receiving the transmitted power wirelessly. The distance between the transmitter and receiver coils at which efficient energy transfer can take place, is a function of a coupling coefficient between the coils. The coupling efficiency may be significantly improved if the coils are sized and operated at such a frequency that they are physically within a so-called "near-field zone" (also referred to as a coupling region) of each other.

With some proposed systems, a transfer function between the transmitter and the receiver may be a non-monotonic function, which may lead to inefficiencies and potential instability in power transfer.

BRIEF SUMMARY

Embodiments of the present invention create a monotonic transfer function across the power transfer system by adjusting resonant frequencies of the coils and accompanying components of the transmitter, the receiver, or both.

Embodiments of the present disclosure include a power-transmitting device comprising a frequency generator and a transmit resonance circuit. The frequency generator is configured to generate a power-transmit frequency. The transmit resonance circuit is operably coupled to the power-transmit frequency and includes a transmit coil configured to generate a near-field electromagnetic radiation at a coupling frequency for coupling to a receive coil within a coupling region of the transmit coil. The transmit resonance circuit also includes a transmit resonance adjuster operably coupled to the transmit coil and configured to adjust the coupling frequency to be sufficiently less than the power-transmit frequency such that a monotonic transfer function is developed between the power-transmit frequency and a power-receiving device bearing the receive coil positioned in the coupling region.

Further embodiments of the present disclosure include a method of transmitting power. The method includes generating a power-transmit frequency and stimulating a transmit coil and a transmit resonance adjuster with the power-transmit frequency to generate a near-field electromagnetic radiation at a coupling frequency for coupling to a receive coil within a coupling region of the transmit coil. The method also includes developing a monotonic transfer function between the power-transmit frequency and a power-receiving device bearing the receive coil positioned in the coupling region by adjusting the coupling frequency with the transmit resonance adjuster to be sufficiently less than the power-transmit frequency.

Further embodiments of the present disclosure include a power-receiving device, including a receive resonance circuit configured to generate a receive resonance frequency. The receive resonance circuit includes a receive coil for receiving near-field electromagnetic radiation at a coupling frequency when within a coupling region of a transmit coil. The receive resonance circuit also includes a receive resonance adjuster operably coupled to the receive coil and configured to adjust the receive resonance frequency to be sufficiently less than a power-transmit frequency of a power-transmitting device bearing the transmit coil to develop a monotonic transfer function between the power-transmit frequency and the receive resonance frequency.

Still further embodiments of the present disclosure include a method of receiving power. The method includes stimulating a receive coil and a receive resonance adjuster to generate a receive resonance frequency by positioning the receive coil in a coupling region of a transmit coil generating a near-field electromagnetic radiation at a coupling frequency, wherein the coupling frequency is generated from a power-transmit frequency equal to or greater than the coupling frequency. The method also includes developing a monotonic transfer function between the power-transmit frequency and the receive resonance frequency by adjusting the receive resonance frequency to be sufficiently less than the power-transmit frequency with the receive resonance adjuster.

Still further embodiments of the present disclosure include a wireless power-transfer system including a power-transmitting device and a power-receiving device. The power-transmitting device includes a frequency generator for generating a power-transmit frequency. The power-transmitting device also includes a transmit coil for generating a near-field electromagnetic radiation at a transmit resonance frequency and transmit resonance adjuster operably coupled to the transmit coil and configured for adjusting the transmit resonance frequency. The power-receiving device includes a receive coil for receiving the near-field electromagnetic radiation when within a coupling region of the transmit coil and a receive resonance adjuster operably coupled to the receive coil and configured for adjusting a receive resonance frequency of a combination of the receive coil and the receive resonance adjuster. In the wireless power-transfer system, one or both of the transmit resonance adjuster and the receive resonance adjuster is configured to adjust its corresponding frequency to be sufficiently less than the power-transmit frequency such that a monotonic transfer function is developed between the power-transmit frequency and the receive resonance frequency.

DETAILED DESCRIPTION

Figure 1:
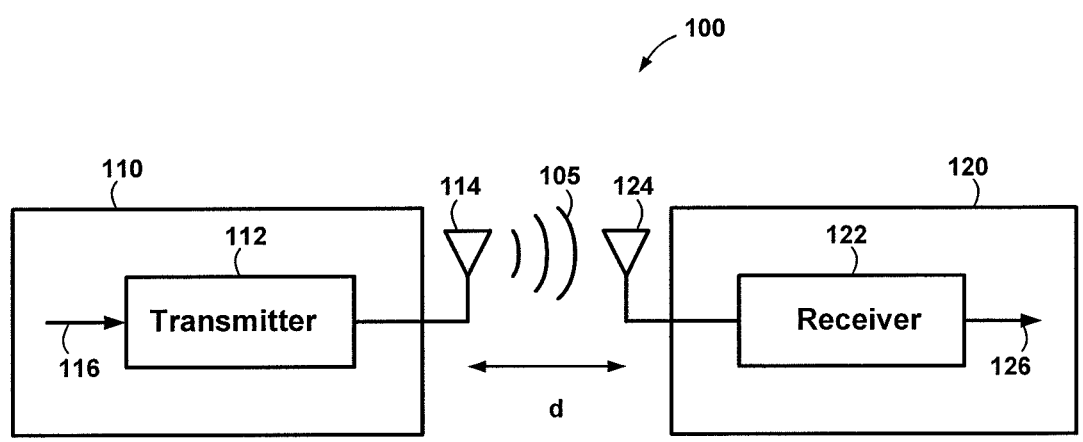
FIG. 1 is a block diagram of an inductive wireless power-transfer system.

In the following description, reference is made to the accompanying drawings in which is shown, by way of illustration, specific embodiments of the present disclosure. The embodiments are intended to describe aspects of the disclosure in sufficient detail to enable those skilled in the art to practice the invention. Other embodiments may be utilized and changes may be made without departing from the scope of the disclosure. The following detailed description is not to be taken in a limiting sense, and the scope of the present invention is defined only by the appended claims.

Furthermore, specific implementations shown and described are only examples and should not be construed as the only way to implement or partition the present disclosure into functional elements unless specified otherwise herein. It will be readily apparent to one of ordinary skill in the art that the various embodiments of the present disclosure may be practiced by numerous other partitioning solutions.

In the following description, elements, circuits, and functions may be shown in block diagram form in order not to obscure the present disclosure in unnecessary detail. Additionally, block definitions and partitioning of logic between various blocks is exemplary of a specific implementation. It will be readily apparent to one of ordinary skill in the art that the present disclosure may be practiced by numerous other partitioning solutions. Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general-purpose processor, a special-purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A general-purpose processor may be considered a special-purpose processor while the general-purpose processor is configured to execute instructions (e.g., software code) stored on a computer-readable medium. A processor may also be implemented as a combination of computing devices, such as a combination of a DSP and a microprocessor, a plurality of microprocessors, one or more microprocessors in conjunction with a DSP core, or any other such configuration.

In addition, it is noted that the embodiments may be described in terms of a process that may be depicted as a flowchart, a flow diagram, a structure diagram, or a block diagram. Although a process may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more instructions or code on computer readable media. Computer-readable media includes both computer storage media and communication media, including any medium that facilitates transfer of a computer program from one place to another.

Figure 3:
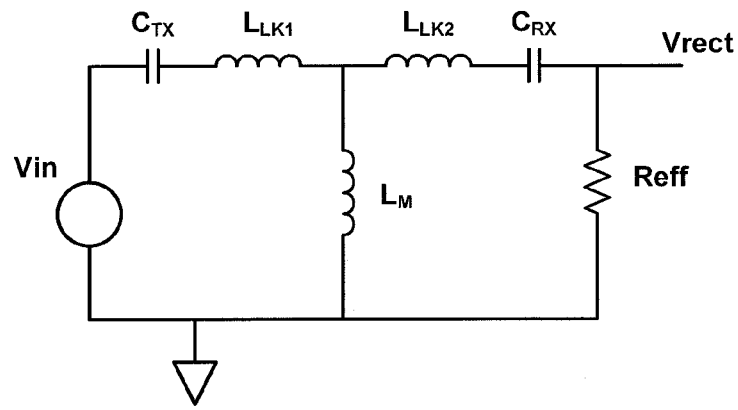
FIG. 3 is a schematic diagram of a small signal equivalent model showing inductive and capacitive elements that may be present when a transmitter and receiver are coupled.

Elements described herein may include multiple instances of the same element. These elements may be generically indicated by a numerical designator (e.g. 110) and specifically indicated by the numerical indicator followed by an alphabetic designator (e.g., 110A) or a numeric indicator preceded by a "dash" (e.g., 110-1). For ease of following the description, for the most part element number indicators begin with the number of the drawing on which the elements are introduced or most fully discussed. For example, where feasible elements in FIG. 3 are designated with a format of 3xx, where 3 indicates FIG. 3 and xx designates the unique element.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed or that the first element must precede the second element in some manner. In addition, unless stated otherwise, a set of elements may comprise one or more elements.

The words "wireless power" are used herein to mean any form of energy associated with electric fields, magnetic fields, electromagnetic fields, or otherwise that is transmitted from a transmitter to a receiver without the use of physical electromagnetic conductors.

"Monotonic" and "monotonic transfer function" as used herein mean the classical mathematical definition of a function that tends to move in only one direction as "x" changes within a region of interest. In other words, as "x" changes within the region of interest the monotonic transfer function of "x" will only increase or only decrease.

"Non-monotonic" and "non-monotonic transfer function" as used herein mean the classical mathematical definition of a function that moves in more than one direction as "x" changes within a region of interest. In other words, as "x" changes within the region of interest the non-monotonic transfer function of "x" will both increase and decrease.

Embodiments of the present invention create a monotonic transfer function across the power transfer system by adjusting resonant frequencies of the coils and accompanying components of the transmitter, the receiver, or both.

FIG. 1 is a block diagram of an inductive wireless power-transfer system 100. The inductive wireless power-transfer system 100 includes a power-transmitting device 110, and a power-receiving device 120. The power-transmitting device 110 includes a transmitter 112 coupled with a transmit coil 114 configured to generate an electromagnetic field 105 for providing energy transfer to the power-receiving device 120. The power-receiving device 120 includes a receiver 122 coupled with a receive coil 124 configured to couple with the electromagnetic field 105. The transmit coil 114 and the receive coil 124 may be sized according to the particular devices and applications to be associated therewith.

An input power signal 116 is provided to the transmitter 112 for providing the transmitter 112 with the power for generating the electromagnetic field 105, which provides energy transfer to the power-receiving device 120. The receiver 122 couples to the electromagnetic field 105 and generates an output power 126 in response thereto. The output power signal 126 may provide the power that is used by the power-receiving device 120 for storing (e.g., charging a battery), consumption (e.g., providing system power), or both.

The transmit coil 114 and the receive coil 124 are separated by a distance (d). In some embodiments, the transmitter 112 and the receiver 122 may be configured according to a mutual inductance relationship, such that when the resonant frequency of the receiver 122 and the resonant frequency of the transmitter 112 are substantially the same, transmission losses between the transmitter 112 and the receiver 122 are minimal. In other words, an efficient energy transfer occurs by coupling a large portion of the energy in a near field of the transmit coil 114 to the receive coil 124 rather than propagating most of the energy in an electromagnetic wave to the far field. If the power-receiving device 120 is in the near field, a coupling mode for the near-field electromagnetic radiation may be developed between the transmit coil 114 and the receive coil 124. The area around the transmit coil 114 and receive coil 124 where this near-field coupling may occur may be referred to as a coupling region.

As non-limiting examples, the power-receiving device 120 may be a mobile electronic device such as a cell phone, smart phone, media player (e.g., mp3 player), electronic reader, tablet, personal digital assistant (PDA), camera, lap top computer, and personal electronic device in which wireless power may be received. As other non-limiting examples, the power-receiving device 120 may also be a less mobile electronic device, such as a television, personal computer, media player (e.g., DVD player, Blu-ray player, etc.) or any other device that may run from, or store electrical power. For even more non-limiting examples, the power-receiving device 120 may be one of a number of other items, such as an automobile or any other devices that may include batteries that may be charged through the power-transmitting device 110.

The power-transmitting device 110 (may also be referred to herein as a base station) may include a number of structures, device, or combinations thereof bearing the transmit coil 114. As non-limiting examples, the wireless power-transmitting device 110 may include furniture, floors, walls, ceilings, and vehicles bearing a transmit coil 114 positioned such that a power-receiving device 120 may be disposed within the coupling region of the transmit coil 114. As other non-limiting examples, wireless the power-transmitting device 110 may include electronic devices such as, televisions, personal computers, media players (e.g., radio, DVD player, Blu-ray player, etc.) or any other device for which in may be useful to provide wireless power transfer to a power-receiving device 120.

Figure 2:
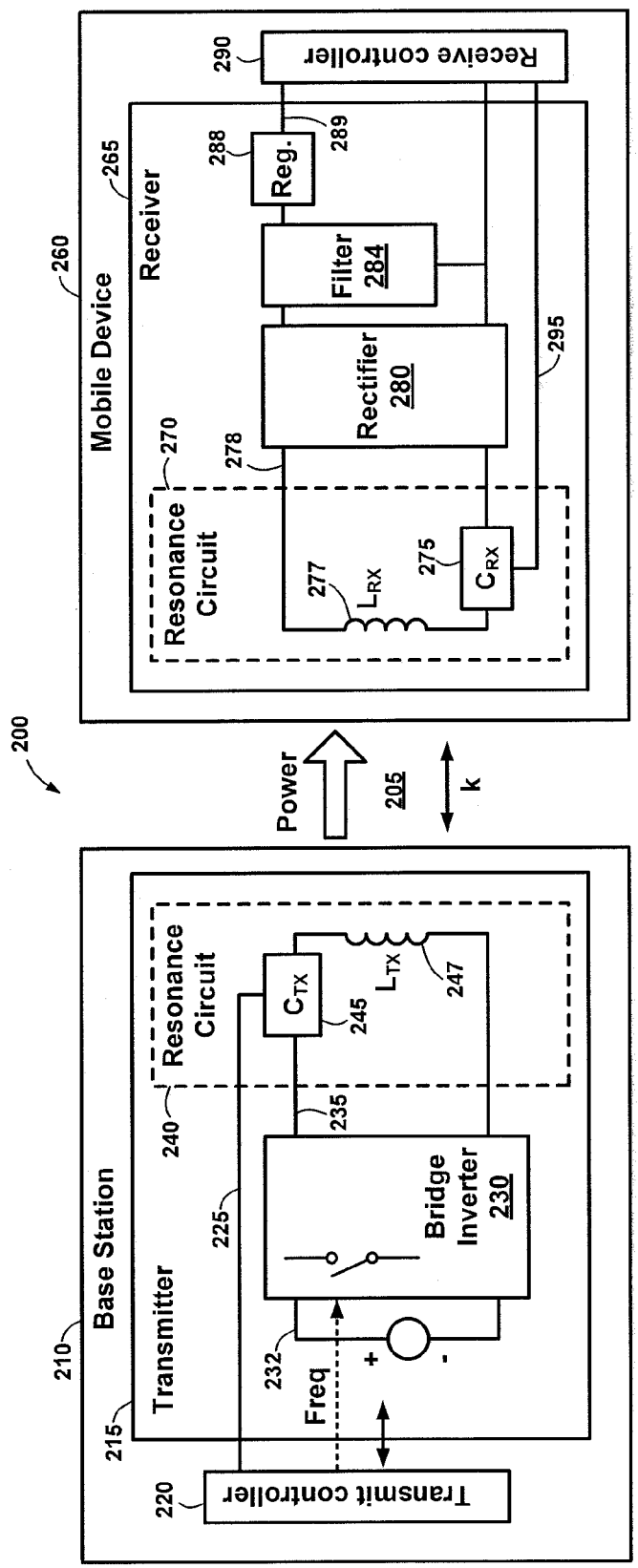
FIG. 2 is a detailed block diagram on an inductive wireless power-transfer system according to one or more embodiments of the present disclosure.

FIG. 2 is a detailed block diagram on an inductive wireless power-transfer system 200 according to one or more embodiments of the present disclosure. A base station 210 (e.g., the power-transmitting device 110 of FIG. 1) may inductively transmit power to a mobile device 260 (.e.g., the power-receiving device 120 of FIG. 1) using near-field electromagnetic radiation in a coupling region 205.

The base station 210 may include a transmit controller 220 and a wireless power transmitter 215. The wireless power transmitter 215 may include a bridge inverter 230 (may also be referred to herein as a frequency generator) and a transmit resonance circuit 240. The bridge inverter 230 is coupled to a Direct Current (DC) power source (power input 232) and is controlled by a frequency control signal (indicated with a dashed line) from the transmit controller 220. The bridge inverter 230 may be any suitable circuit for converting a DC power source to an Alternating Current (AC) signal at a desired frequency responsive to the frequency control signal. As non-limiting examples, the bridge inverter 230 may be a half-bridge inverter or a full-bridge inverter. Moreover, other types of frequency generators suitable for providing the power and frequency needed to drive the transmit resonance circuit 240 may be used. The output of the bridge inverter 230 is a power-transmit frequency 235, which may, in some embodiments, be filtered, smoothed, or a combination thereof, before driving the transmit resonance circuit 240.

The transmit resonance circuit 240 is coupled to the power-transmit frequency 235 and includes a transmit coil 247 ($L_{TX}$) coupled to a transmit resonance adjuster 245 ($C_{TX}$). The transmit resonance circuit 240 is configured to develop a coupling frequency (may also be referred to herein as a transmit resonance frequency) determined by impedances of the transmit coil 247 and the transmit resonance adjuster 245.

The transmit controller 220 may include a processor (e.g., microprocessor) and other peripherals (e.g., memory). Memory may include non-volatile memory (e.g., ROM) and volatile memory (e.g., RAM). In some embodiment, the transmit controller 220 may sample signals such as the power-transmit frequency 235 and the transmit resonance frequency. Analysis of these frequencies may be used to form a control loop to adjust the power-transmit frequency 235. Analysis of these frequencies also may be used to form a control loop to adjust the transmit resonance frequency via the transmit resonance control signal 225.

As a non-limiting example, the control loops may include a linear feedback control system, such as, for example, a proportional integral derivative controller. Of course, other feedback/control topologies may also be used.

The mobile device 260 may include a receive controller 290 and a wireless power receiver 265. The wireless power receiver 265 may include a receive resonance circuit 270, a rectifier 280, a filter 284, and a regulator 288.

The receive resonance circuit 270 may be inductively coupled with the transmit resonance circuit 240 such that power at an inductive coupling factor (k) is transferred therebetween. The receive resonance circuit 270 includes a receive coil 277 ($L_{RX}$) coupled to a receive resonance adjuster 275 ($C_{RX}$). The receive resonance circuit 270 is configured to develop a receive resonance frequency 278 determined by impedances of the receive coil 277 and the receive resonance adjuster 275.

In some embodiments, the rectifier 280 may be used to convert the receive resonance frequency 278 to a DC signal. The filter 284 and voltage regulator 288 may be used in some embodiments to further smooth the DC signal and set it to an appropriate DC voltage as a power output 289 for use by the receive controller 290.

The receive controller 220 may include a processor (e.g., microprocessor) and other peripherals (e.g., memory). Memory may include non-volatile memory (e.g., ROM) and volatile memory (e.g., RAM). In some embodiment, the receive controller 220 may sample signals such as the receive resonance frequency. Analysis of these frequencies may be used to form a control loop to adjust the receive resonance frequency 278 via a receive resonance control signal 295. As a non-limiting example, the control loops may include a linear feedback control system, such as, for example, a proportional integral derivative controller. Of course, other feedback/control topologies may also be used.

The receive controller 290 may generally include a load, which may generally include a battery for charging from the power output 289, the circuitry of the receive controller 290, or a combination thereof.

The transmit coil 247 and the receive coil 277 may be considered like antennas that may be configured as a "loop" antenna, which may also be referred to herein as a "magnetic" antenna or an "inductive" antenna. Loop antennas may be configured to include an air core or a physical core such as a ferrite core. Air core loop antennas may be more tolerable to extraneous physical devices placed in the vicinity of the core. Furthermore, an air core loop antenna allows the placement of other components within the core area. In addition, an air core loop may more readily enable placement of the receive coil 277 within a plane of the transmit coil 247 where the coupling region 205 of the transmit coil 247 may be more powerful.

As stated, efficient transfer of energy between the wireless power transmitter 215 and wireless power receiver 265 may occur during matched or nearly matched resonance between the transmit resonance circuit 240 and the receive resonance circuit 270. However, even when the resonances are not matched, energy may still be transferred, but at a somewhat lower efficiency. Transfer of energy occurs by coupling energy from the near field of the transmit coil 247 to the receive coil 277 residing in the neighborhood where this near field is established rather than propagating the energy from the transmit coil 247 into free space.

The resonant frequency of the loop or magnetic antennas is based primarily on the inductance and capacitance. Inductance in a loop antenna is generally simply the inductance created by the loop, whereas, capacitance is generally added to the loop antenna's inductance to create a resonant structure at a desired resonant frequency.

FIG. 3 is a schematic diagram of a small signal equivalent model showing inductive and capacitive elements that may be present when a transmitter and receiver are coupled. In FIG. 3, the transmit coil 247 (FIG. 2) is broken into a leakage inductor $L_{LK1}$ representing inefficiencies from the power transfer on the transmit side and a magnetizing inductance $L_M$. The receive coil 277 (FIG. 2) is broken into a leakage inductor $L_{LK2}$ representing inefficiencies from the power transfer on the receive side and the magnetizing inductance $L_M$. The capacitor $C_{TX}$ represents capacitance of the transmit resonance adjuster 245 and the capacitor $C_{RX}$ represents capacitance of the receive resonance adjuster 245. The circuit is stimulated by an AC signal ($V_{IN}$) (e.g., the power-transmit frequency 235 of FIG. 2). The resistor $R_{EFF}$ is a simplified model of the load from the filter 284, regulator 288, and the receive controller 290 of FIG. 2.

The resonant frequencies of the transmit resonance circuit 240 and the receive resonance circuit 270 may be separately adjusted by the transmit resonance adjuster 245 and the receive resonance adjuster 275, respectively. Resonances may be adjusted such that the resonant frequencies between the transmit side and the receive side are very close to optimize power transfer. Moreover, in embodiments of the present disclosure, the resonant frequencies also may be adjusted to be sufficiently less than the power-transmit frequency 235 such that a monotonic transfer function is developed between the power-transmit frequency 235 and the receive resonance frequency 278 when the mobile device 260 bearing the receive coil 277 is positioned in the coupling region 205 of the transmit coil 247.

In some embodiments, there may be communication capabilities between the base station 210 and the mobile device 260. This communication may be part of the near-field electromagnetic radiation or may be on a separate channel. In such systems, the base station 210 and mobile device 260 may exchange information such as load, power-transmit frequency 235 values, and resonance frequencies, which may be useful in setting resonance frequencies for the base station 210, the mobile device 260, or both.

Figure 4A:
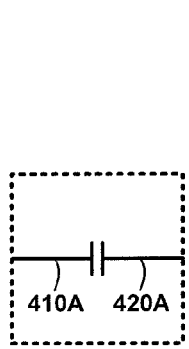
FIGS. 4A-4C are circuit diagrams of example resonance adjusters that may be used in wireless power transmitters and wireless power receivers according to one or more embodiments of the present disclosure.
Figure 4B:
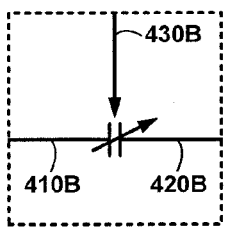
Figure 4C:
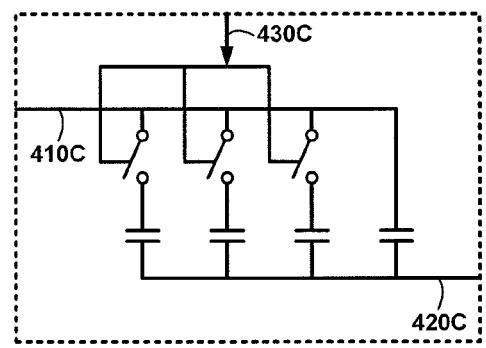

FIGS. 4A-4C are circuit diagrams of example resonance adjusters that may be used in wireless power transmitting devices and wireless-power-receiving devices according to one or more embodiments of the present disclosure. Reference will be made to FIGS. 2 and 4A-4C to describe the resonance adjusters. FIGS. 4A-4C illustrate resonance adjusters that may be used as the transmit resonance adjuster 245 and the receive resonance adjuster 275. Of course, many other configuration of resonance adjusters are possible and may include capacitive, inductive, resistive, and active components.

In a non-limiting simple form illustrated in FIG. 4A, the resonance adjuster may be a simple capacitor between terminal 410A and terminal 420A. In this form, the capacitor may be set relative to the corresponding coil (e.g., transmit coil 247 or receive coil 277) to create a resonant frequency that is less than the power-transmit frequency 235 as explained more fully below.

In another non-limiting form illustrated in FIG. 4B, the resonance adjuster may be a variable capacitor between terminal 410B and terminal 420B that is controlled by input signal 430B. The input signal 430B would be coupled to either the transmit resonance control signal 225 or the receive resonance control signal 295. In this form, the variable capacitor may be set and adjusted relative to the corresponding coil (e.g., transmit coil 247 or receive coil 277) to create a resonant frequency that is less than the power-transmit frequency 235 as explained more fully below.

In another non-limiting form illustrated in FIG. 4C, the resonance adjuster may be a network between terminal 410C and terminal 420C that is controlled by input signal 430C. The input signal 430C would be coupled to either the transmit resonance control signal 225 or the receive resonance control signal 295. In this form, the network may include active components configured as switches to selectively switch a corresponding capacitor in to the network to create a variable capacitance for the resonance adjuster. As a non-limiting example, the switches may be configured as transistors, such as Metal Oxide Semiconductor (MOS) transistors. The network may be set and adjusted relative to the corresponding coil (e.g., transmit coil 247 or receive coil 277) to create a resonant frequency that is less than the power-transmit frequency 235 as explained more fully below.

Figure 5:
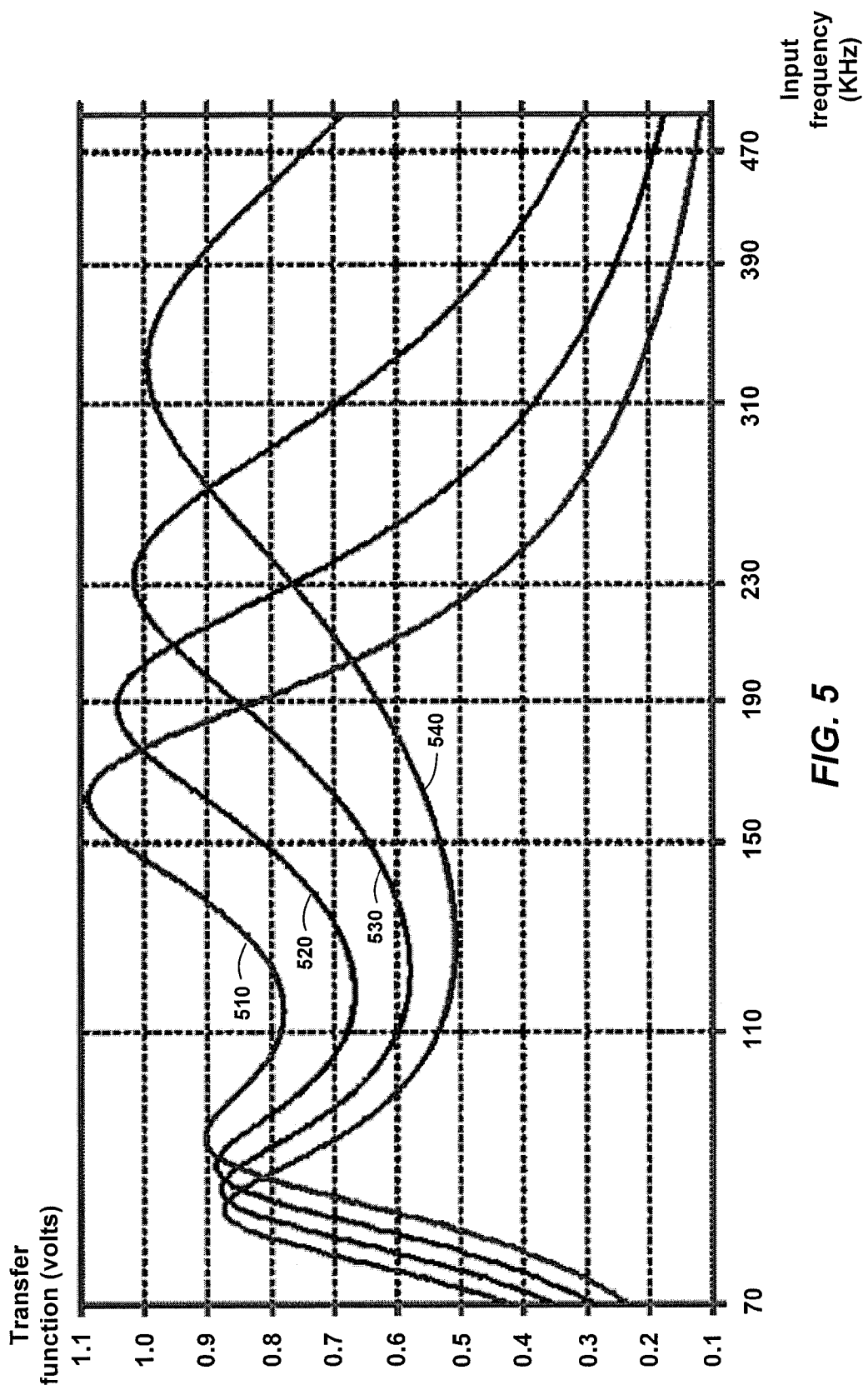
FIG. 5 is a graph of transfer functions at various coupling coefficients for some proposed wireless power-transfer systems.

FIG. 5 is a graph of transfer functions at various coupling coefficients for some proposed wireless power-transfer systems. The transfer functions are expressed as a ratio of voltage at the input (.e.g., the power input 232 of FIG. 2) relative to voltage at the output (e.g., the power output 289 of FIG. 2). The x-axis indicates various frequencies for the power-transmit frequency 235 with the transmit resonance circuit 240 and the receive resonance circuit 270 set to resonate near the power-transmit frequency 235.

Curve 510 indicates a transfer function that may be achieved over various frequencies of the power-transmit frequency 235 with a coupling coefficient k=0.6. Curve 520 indicates a transfer function that may be achieved over various frequencies of the power-transmit frequency 235 withal coupling coefficient k=0.7. Curve 530 indicates a transfer function that may be achieved over various frequencies of the power-transmit frequency 235 withal coupling coefficient k=0.8. Curve 540 indicates a transfer function that may be achieved over various frequencies of the power-transmit frequency 235 with a coupling coefficient k=0.9.

In some proposed wireless power systems, when the resonance frequencies are set to the power-transmit frequency 235, the resulting transfer function can be non-monotonic. For example, over a region of interest of about 70 KHz to about 500 KHz, the transfer functions can include a minimum point and a maximum point such that the transfer function may both increase and decrease within this region of interest. This non-monotonic behavior may cause instabilities in some types of systems. For example in systems with control feedback loops, the feedback loop may have difficulty arriving at a stable resonance frequency if it is vacillating back and forth across the minimum or maximum point of the transfer function.

Figure 6:
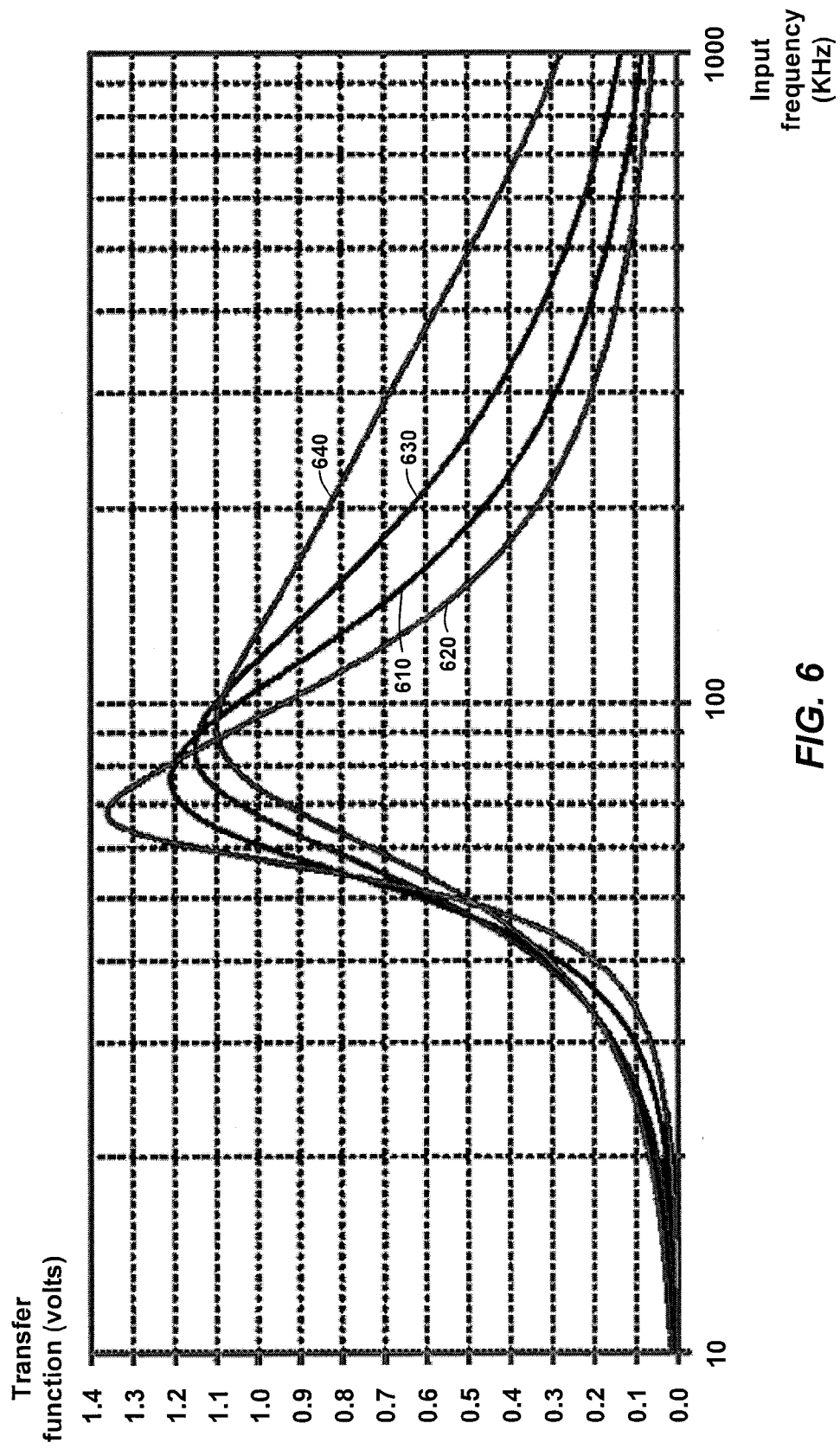
FIG. 6 is a graph of transfer functions at various coupling coefficients for wireless power-transfer systems using an embodiment of the present disclosure.

FIG. 6 is a graph of transfer functions at various coupling coefficients for wireless power-transfer systems using an embodiment of the present disclosure. The transfer functions are expressed as a ratio of voltage at the input (.e.g., the power input 232 of FIG. 2) relative to voltage at the output (e.g., the power output 289 of FIG. 2). The x-axis indicates various frequencies for the power-transmit frequency 235 with the transmit resonance circuit 240 and the receive resonance circuit 270 set to resonate at about 80 kHz.

Curve 610 indicates a transfer function that may be achieved over various frequencies of the power-transmit frequency 235 with a coupling coefficient k=0.6. Curve 620 indicates a transfer function that may be achieved over various frequencies of the power-transmit frequency 235 withal coupling coefficient k=0.7. Curve 630 indicates a transfer function that may be achieved over various frequencies of the power-transmit frequency 235 withal coupling coefficient k=0.8. Curve 640 indicates a transfer function that may be achieved over various frequencies of the power-transmit frequency 235 withal coupling coefficient k=0.9.

In embodiments of the present disclosure, when the resonance frequencies are set to be sufficiently lower than the power-transmit frequency 235, the resulting transfer function may be monotonic over the region of interest of about 70 KHz to about 500 KHz. In other words, within the region of interest the transfer function moves in only one direction as the frequency changes. This monotonic behavior may be much easier for control feedback loops to arrive at a stable resonance frequency.

Of course, FIG. 6 is given as one example of resonance frequencies set to about 80 KHz. Other resonance frequencies may be suitable for developing a monotonic transfer function. Moreover, in some systems where the power-transmit frequency 235 is set to a higher frequency, such as, for example 200 KHz, the transmit resonance circuit 240, the receive resonance circuit 270, or both, may be set to a much higher frequency to achieve higher efficiencies but still be sufficiently less than the power-transmit frequency 235 to develop a monotonic transfer function. As a non-limiting example, resonance frequencies of about 180 KHz would be sufficient to develop a monotonic transfer function relative to a power-transmit frequency 235 of about 200 KHz.

Figure 7:
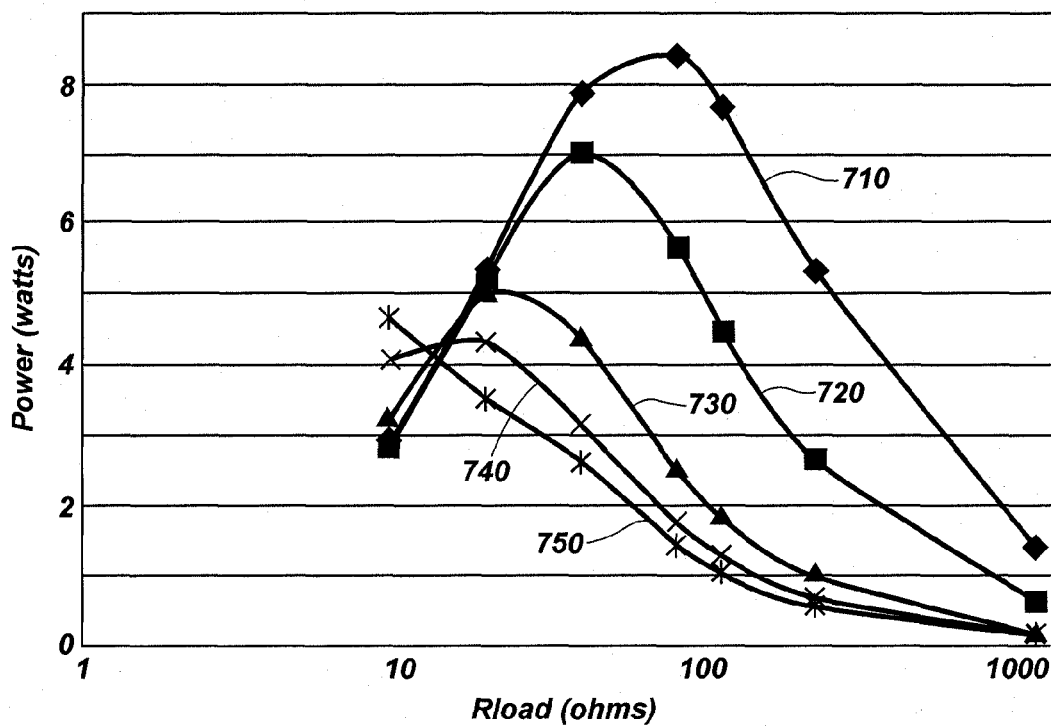
FIG. 7 is a graph of power output at various frequencies for some proposed wireless power-transfer systems.

FIG. 7 is a graph of power output at various frequencies for some proposed wireless power-transfer systems. Curve 710 indicates power output that may be achieved over various loads (e.g., $R_{EFF}$ in FIG. 3) when the power-transmit frequency 235 (FIG. 2) is set at 110 KHz. Curve 720 indicates power output that may be achieved over various loads when the power-transmit frequency 235 is set at 125 KHz. Curve 730 indicates power output that may be achieved over various loads when the power-transmit frequency 235 is set at 150 KHz. Curve 740 indicates power output that may be achieved over various loads when the power-transmit frequency 235 is set at 175 KHz. Curve 750 indicates power output that may be achieved over various loads when the power-transmit frequency 235 is set at 200 KHz.

Figure 8:
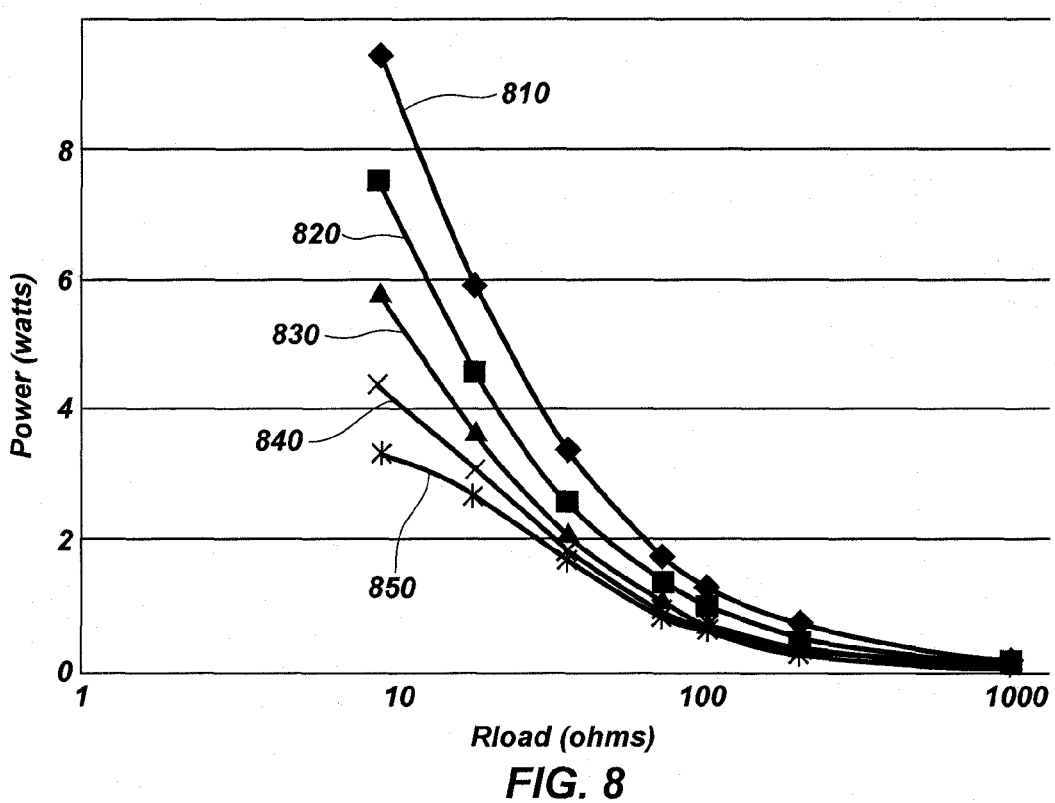
FIG. 8 is a graph of power output at various frequencies for wireless power-transfer systems using an embodiment of the present disclosure.

FIG. 8 is a graph of power output at various frequencies for wireless power-transfer systems using an embodiment of the present disclosure. Curve 810 indicates power output that may be achieved over various loads (e.g., $R_{EFF}$ in FIG. 3) when the power-transmit frequency 235 (FIG. 2) is set at 110 KHz. Curve 820 indicates power output that may be achieved over various loads when the power-transmit frequency 235 is set at 125 KHz. Curve 830 indicates power output that may be achieved over various loads when the power-transmit frequency 235 is set at 150 KHz. Curve 840 indicates power output that may be achieved over various loads when the power-transmit frequency 235 is set at 175 KHz. Curve 850 indicates power output that may be achieved over various loads when the power-transmit frequency 235 is set at 200 KHz.

As can be seen when comparing the power outputs in FIG. 7 relative to the power outputs of an embodiment of the present disclosure in FIG. 8, depending on load, power outputs from embodiments of the present disclosure may be as good as, and perhaps even better than, conventional power outputs without the potential instabilities due to non-monotonic behavior of other proposed systems.

Figure 9:
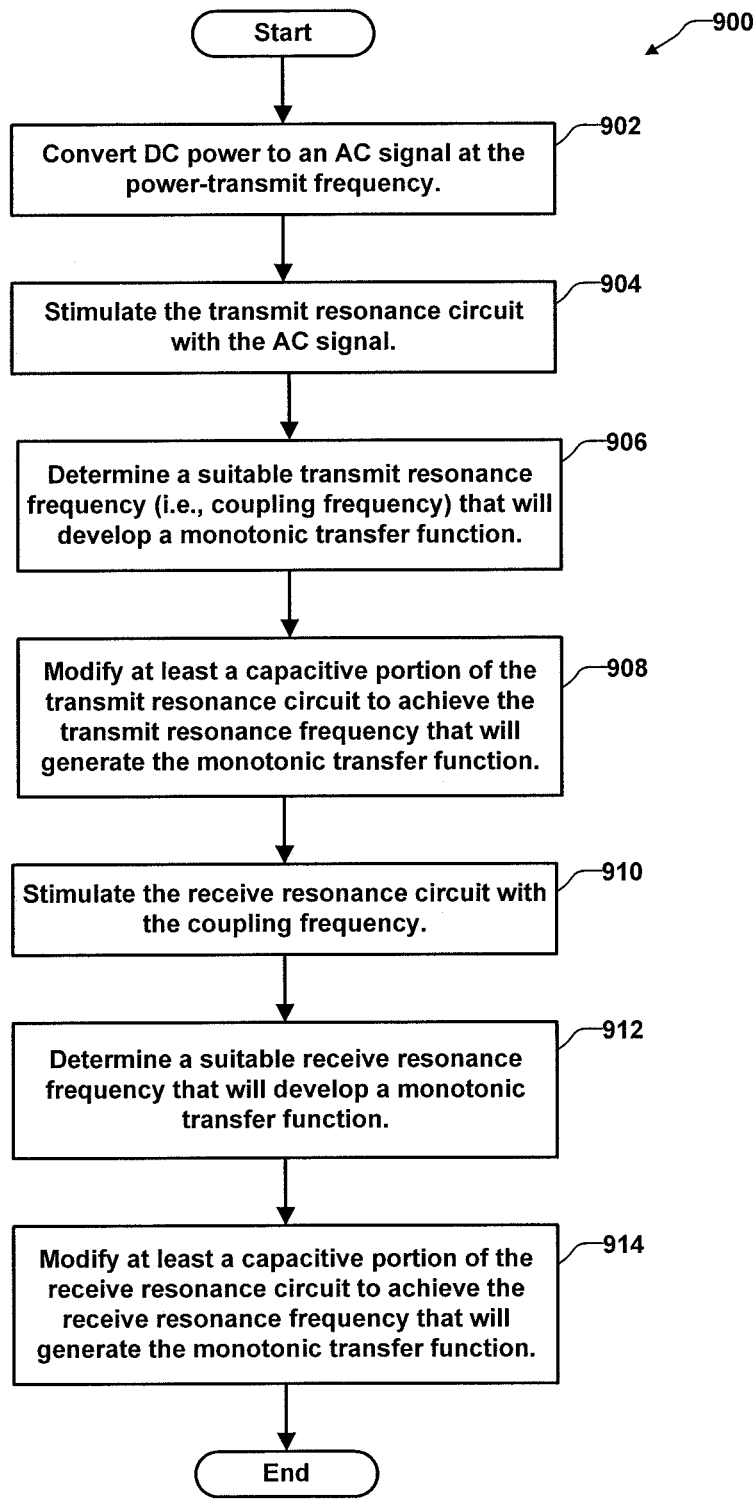
FIG. 9 is a flow chart illustrating a method for inductive wireless power transfer according to an embodiment of the present disclosure.

FIG. 9 is a flow chart illustrating a method 900 for inductive wireless power transfer according to an embodiment of the present disclosure. Reference will also be made to FIG. 2 in describing the operations of FIG. 9. Operation block 902 indicates that the system may convert DC power to AC power at the power-transmit frequency 235. For various combinations of the base station 210 and the mobile device 260, this frequency may be modified during operation.

Operation block 904 indicates that the transmit resonance circuit 240 is stimulated by the power-transmit frequency 235. Operation block 906 indicates that a suitable transmit resonance frequency (i.e., coupling frequency) may be determined that will develop a monotonic transfer function relative to the power-transmit frequency 235. In some embodiments, this analysis may be performed during development of the various devices and coded into the base station 210. In some embodiments, this analysis may be performed during operation and modified based on various frequencies and power transfer efficiencies of the base station 210, the mobile device 260, or both.

Operation block 908 indicates that at least a capacitive portion of the transmit resonance circuit may be modified to achieve the transmit resonance frequency that will generate the monotonic transfer function.

Operation block 910 indicates that the receive resonance circuit 270 is stimulated by inductive coupling from the transmit resonance circuit 240 resonating at the coupling frequency to the receive resonance circuit 270.

Operation block 912 indicates that a suitable receive resonance frequency may be determined that will develop a monotonic transfer function relative to the power-transmit frequency 235. In some embodiments, this analysis may be performed during development of the various devices and coded into the mobile device 260. In some embodiments, this analysis may be performed during operation and modified based on various frequencies and power transfer efficiencies of the base station 210, the mobile device 260, or both.

Operation block 914 indicates that at least a capacitive portion of the receive resonance circuit 270 may be modified to achieve the receive resonance frequency that will generate the monotonic transfer function.

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventor.

What is claimed is:

1. A power-transmitting device, comprising:
   a frequency generator configured to generate a power-transmit frequency; and
   a transmit resonance circuit operably coupled to the power-transmit frequency and comprising:
      a transmit coil configured to generate a near-field electromagnetic radiation at a coupling frequency for coupling to a receive coil within a coupling region of the transmit coil; and
      a transmit resonance adjuster operably coupled to the transmit coil and comprising one or more components to generate at least some of a capacitive portion of the transmit resonance circuit, the one or more components configured to adjust the coupling frequency to be sufficiently less than the power-transmit frequency such that a monotonic transfer function is developed between the power-transmit frequency and a power-receiving device bearing the receive coil positioned in the coupling region.

2. The power-transmitting device of claim 1, wherein the power-transmit frequency is equal to or greater than about 110 kHz and the coupling frequency is equal to or less than about 80 kHz.

3. The power-transmitting device of claim 1, wherein the one or more components comprise a capacitor such that the coupling frequency is responsive to an inductance of the transmit coil and a capacitance of the capacitor.

4. The power-transmitting device of claim 3, wherein the capacitor is a variable capacitor and a variation in a capacitance of the variable capacitor modifies the coupling frequency.

5. The power-transmitting device of claim 1, wherein the one or more components of the network comprise at least one active component configured to operably and switchably couple at least one corresponding capacitor to the transmit coil.

6. The power-transmitting device of claim 1, further comprising a transmit controller configured to control the transmit resonance adjuster responsive to an analysis to determine the coupling frequency that will develop the monotonic transfer function.

7. A method of transmitting power, comprising:
   generating a power-transmit frequency;
   stimulating a transmit coil and a transmit resonance adjuster with the power-transmit frequency to generate a near-field electromagnetic radiation at a coupling frequency for coupling to a receive coil within a coupling region of the transmit coil; and
   developing a monotonic transfer function between the power-transmit frequency and a power-receiving device bearing the receive coil positioned in the coupling region by adjusting the coupling frequency to be sufficiently less than the power-transmit frequency with the transmit resonance adjuster.

8. The method of claim 7, wherein the power-transmit frequency is equal to or greater than about 110 kHz and the coupling frequency is equal to or less than about 80 kHz.

9. The method of claim 7, further comprising adjusting at least a capacitive portion of the transmit resonance adjuster to adjust the coupling frequency.

10. The method of claim 9, wherein adjusting at least the capacitive portion comprises selectively and operably coupling one or more capacitors to the transmit coil.

11. The method of claim 7, further comprising:
    performing an analysis to determine the coupling frequency that will develop the monotonic transfer function; and
    controlling the transmit resonance adjuster to develop the coupling frequency.

12. A power-receiving device, comprising:
    a receive resonance circuit configured to generate a receive resonance frequency, comprising:
       a receive coil for receiving near-field electromagnetic radiation at a coupling frequency when within a coupling region of a transmit coil; and
       a receive resonance adjuster operably coupled to the receive coil and comprising one or more components to generate at least some of a capacitive portion of the receive resonance circuit, the one or more components configured to adjust the receive resonance frequency to be sufficiently less than a power-transmit frequency of a power-transmitting device bearing the transmit coil to develop a monotonic transfer function between the power-transmit frequency and the receive resonance frequency.

13. The power-receiving device of claim 12, wherein the power-transmit frequency is equal to or greater than about 110 kHz and the receive resonance frequency is equal to or less than about 80 kHz.

14. The power-receiving device of claim 12, wherein the one or more components comprise a capacitor such that the receive resonance frequency is responsive to an inductance of the receive coil and a capacitance of the capacitor.

15. The power-receiving device of claim 14, wherein the capacitor is a variable capacitor and a variation in a capacitance of the variable capacitor modifies the receive resonance frequency.

16. The power-receiving device of claim 12, wherein the one or more components of the network comprise at least one active component configured as a switch operably coupled to include at least one corresponding capacitor.

17. The power-receiving device of claim 12, further comprising a receive controller configured to control the receive resonance adjuster responsive to an analysis to determine the receive resonance frequency that will develop the monotonic transfer function.

18. A method of receiving power, comprising:
stimulating a receive coil and a receive resonance adjuster comprising one or more components to generate a receive resonance frequency by positioning the receive coil in a coupling region of a transmit coil generating a near-field electromagnetic radiation at a coupling frequency, wherein the coupling frequency is generated from a power-transmit frequency equal to or greater than the coupling frequency; and
developing a monotonic transfer function between the power-transmit frequency and the receive resonance frequency by configuring the one or more components to adjust the receive resonance frequency to be sufficiently less than the power-transmit frequency.

19. The method of claim 18, wherein the power-transmit frequency is equal to or greater than about 110 kHz and the receive resonance frequency is equal to or less than about 80 kHz.

20. The method of claim 18, further comprising configuring the one or more components to adjust at least a capacitive portion of the receive resonance adjuster to adjust the receive resonance frequency.

21. The method of claim 20, wherein adjusting at least the capacitive portion comprises selectively and operably coupling one or more capacitors to the receive coil.

22. The method of claim 18, further comprising:
performing an analysis to determine the receive resonance frequency that will develop the monotonic transfer function; and
controlling the one or more components of the receive resonance adjuster to develop the receive resonance frequency.

23. A wireless power-transfer system, comprising:
power-transmitting device, comprising:
a frequency generator for generating a power-transmit frequency;
a transmit coil for generating a near-field electromagnetic radiation at a transmit resonance frequency; and
a transmit resonance adjuster operably coupled to the transmit coil and comprising one or more transmit components to generate at least some of a transmit capacitance for adjusting the transmit resonance frequency from a combination of the transmit coil and the transmit resonance adjuster; and
a power-receiving device, comprising:
a receive coil for receiving the near-field electromagnetic radiation when within a coupling region of the transmit coil; and
a receive resonance adjuster operably coupled to the receive coil and comprising one or more receive components to generate at least some of a receive capacitance for adjusting a receive resonance frequency from a combination of the receive coil and the receive resonance adjuster;
wherein one or both of the transmit resonance adjuster and the receive resonance adjuster is configured to adjust its corresponding frequency to be sufficiently less than the power-transmit frequency such that a monotonic transfer function is developed between the power-transmit frequency and the receive resonance frequency.

24. The power-receiving device of claim 23, wherein the power-transmit frequency is equal to or greater than about 110 kHz and the receive resonance frequency is equal to or less than about 80 kHz.

* * * * *